(12) United States Patent
Short (10) Patent No.: US 7,286,670 B2
(45) Date of Patent: Oct. 23, 2007

(54) METHOD AND APPARATUS FOR CHAOTIC OPPORTUNISTIC LOSSLESS COMPRESSION OF DATA

(75) Inventor: Kevin M. Short, Durham, NH (US)

(73) Assignee: Chaoticom, Inc., Hampton Falls, NH (US)

( * ) Notice: Subject to any disclaimer, the term of this patent is extended or adjusted under 35 U.S.C. 154(b) by 833 days.

(21) Appl. No.: 10/106,696

(22) Filed: Mar. 26, 2002

(65) Prior Publication Data

US 2002/0154770 A1   Oct. 24, 2002

Related U.S. Application Data

(63) Continuation-in-part of application No. 09/436,910, filed on Nov. 9, 1999, now Pat. No. 6,363,153.

(51) Int. Cl.
   *H04L 9/00*    (2006.01)
   *H04N 7/167*   (2006.01)
   *G06F 13/38*   (2006.01)
   *G06T 9/00*    (2006.01)
   *H04M 11/00*   (2006.01)
   *G10L 21/00*   (2006.01)

(52) U.S. Cl. ............... 380/263; 380/217; 380/269; 710/68; 345/555; 379/88.18; 704/504

(58) Field of Classification Search ........ 380/263, 380/217, 269; 379/88.1; 704/504; 710/68; 345/555
See application file for complete search history.

(56) References Cited

U.S. PATENT DOCUMENTS

4,941,193 A * 7/1990 Barnsley et al. ............ 382/249

(Continued)

FOREIGN PATENT DOCUMENTS

EP   1244274 A1   9/2002

(Continued)

OTHER PUBLICATIONS

Dedieu et al., "Signal coding and Compression Based on Chaos Control Techniques," IEEE, 1995, pp. 1191-1194, XP002325883.

(Continued)

*Primary Examiner*—Emmanuel L. Moise
*Assistant Examiner*—Techane J. Gergiso
(74) *Attorney, Agent, or Firm*—Fish & Neave IP Group of Ropes & Gray LLP; Paul E. Leblond (57) ABSTRACT

The present invention is a compression method for compressing digital data. The data is strings of digital values, which can be broken down to a series of 1's and 0's. The present inventive method uses a chaotic system to compress the data. The first step in the inventive method is generating a plurality of periodic orbits that correspond to a plurality of control bit strings. Each of the periodic orbits is formed with a series of numeric values. The next step is to convert the numeric values of the periodic orbits to digital data values, similar in form to the data to be compressed. The digital data values of the periodic orbits are then organized to identically match the original digital data values. Then the control bit strings corresponding to the organized digital data values of the periodic orbits are identified and saved in order, such that applying the control bit strings to the chaotic system will regenerate the original data.

20 Claims, 7 Drawing Sheets

U.S. PATENT DOCUMENTS

| | | | |
|---|---|---|---|
| 5,040,217 A | 8/1991 | Brandenburg et al. | |
| 5,048,086 A | 9/1991 | Bianco | |
| 5,245,660 A | 9/1993 | Pecora et al. | |
| 5,291,555 A | 3/1994 | Cuomo et al. | |
| 5,347,600 A | 9/1994 | Barnsley et al. | |
| 5,365,589 A | 11/1994 | Gutowitz | |
| 5,416,848 A | 5/1995 | Young | |
| 5,432,697 A * | 7/1995 | Hayes | 700/38 |
| 5,473,694 A * | 12/1995 | Carroll et al. | 380/263 |
| 5,479,512 A | 12/1995 | Weiss | |
| 5,508,473 A | 4/1996 | Chafe | |
| 5,592,555 A | 1/1997 | Stewart | |
| 5,606,144 A | 2/1997 | Dabby | |
| 5,661,788 A | 8/1997 | Chin et al. | |
| 5,680,462 A | 10/1997 | Miller | |
| 5,729,607 A | 3/1998 | DeFries et al. | |
| 5,732,158 A | 3/1998 | Jaenisch | |
| 5,737,360 A | 4/1998 | Grinstein et al. | |
| 5,768,437 A | 6/1998 | Monro et al. | |
| 5,774,385 A | 6/1998 | Bristol | |
| 5,808,225 A | 9/1998 | Corwin et al. | |
| 5,818,712 A | 10/1998 | Glenn, Sr. | |
| 5,838,832 A | 11/1998 | Barnsley | |
| 5,857,025 A | 1/1999 | Anderson | |
| 5,857,165 A | 1/1999 | Coron et al. | |
| 5,923,760 A | 7/1999 | Abarbanel et al. | |
| 6,137,045 A * | 10/2000 | Short et al. | 84/603 |
| 6,178,217 B1 | 1/2001 | Defries et al. | |
| 6,208,951 B1 * | 3/2001 | Kumar et al. | 702/191 |
| 6,212,239 B1 * | 4/2001 | Hayes | 375/259 |
| 6,249,810 B1 | 6/2001 | Kiraly | |
| 6,275,615 B1 | 8/2001 | Ida et al. | |
| 6,363,153 B1 | 3/2002 | Parker et al. | |
| 6,374,177 B1 | 4/2002 | Lee et al. | |
| 6,389,463 B2 | 5/2002 | Bolas et al. | |
| 6,418,138 B1 | 7/2002 | Cerf et al. | |
| 6,546,427 B1 | 4/2003 | Ehrlich | |
| 6,577,716 B1 | 6/2003 | Minter et al. | |
| 6,581,103 B1 | 6/2003 | Dengler | |
| 6,587,563 B1 | 7/2003 | Crandall | |
| 6,631,166 B1 * | 10/2003 | Carroll | 375/259 |
| 6,678,215 B1 | 1/2004 | Treyz et al. | |
| 6,725,022 B1 | 4/2004 | Clayton et al. | |
| 6,744,893 B1 | 6/2004 | Fleming-Dahl | |
| 6,799,201 B1 | 9/2004 | Lee et al. | |
| 6,829,475 B1 | 12/2004 | Lee et al. | |
| 6,980,656 B1 | 12/2005 | Hinton, Sr. et al. | |
| 2001/0012365 A1 | 8/2001 | Gaedke et al. | |
| 2001/0037240 A1 | 11/2001 | Marks et al. | |
| 2001/0042109 A1 | 11/2001 | Bolas et al. | |
| 2002/0001381 A1 | 1/2002 | Mori | |
| 2002/0046084 A1 | 4/2002 | Steele et al. | |
| 2002/0059592 A1 | 5/2002 | Kiraly | |
| 2002/0091790 A1 | 7/2002 | Cubley | |
| 2002/0154770 A1 | 10/2002 | Short | |
| 2002/0164032 A1 | 11/2002 | Short | |
| 2004/0039796 A1 | 2/2004 | Watkins | |
| 2004/0143349 A1 | 7/2004 | Roberts et al. | |
| 2006/0145897 A1* | 7/2006 | Kadono et al. | 341/59 |

FOREIGN PATENT DOCUMENTS

| | | |
|---|---|---|
| EP | 1260949 A1 | 11/2002 |
| JP | 04-097 197 | 3/1992 |
| JP | 06-089 106 | 3/1994 |
| JP | 06-266412 | 9/1994 |
| JP | 07-084580 | 3/1995 |
| JP | 07-140983 | 6/1995 |
| JP | 07-262159 | 10/1995 |
| JP | 10-93549 | 4/1998 |
| JP | 10-143162 | 5/1998 |
| JP | 09-218683 | 8/1998 |
| JP | 11-219185 | 8/1999 |
| WO | WO-99/42990 | 8/1999 |
| WO | WO-99/43136 A1 | 8/1999 |
| WO | WO-01/31839 | 5/2001 |
| WO | WO 200135387 * | 5/2001 |
| WO | WO 200199315 * | 12/2001 |
| WO | WO-02/065386 | 8/2002 |
| WO | WO 2002065386 * | 8/2002 |
| WO | WO-03/003235 A1 | 1/2003 |

OTHER PUBLICATIONS

Carroll et. al., "Synchronizing Chaotic Systems", SPIE Chaos in Communications 32-43, 1993.

Carroll, Thomas L., "Communicating with Use of Filtered, Synchronized Chaotic Signals", IEEE Transactions on Circuits and Systems I: Fundamental Theory and Applications, vol. 42, No. 3, pp. 105-110, Mar. 1995.

Cuomo et. al., "Synchronization of Lorenz-Based Chaotic Circuits with Applications to Communications", IEEE Transactions on Circuits and Systems, 626-633, 1993.

Dachselt, F., "Chaotic Coding and Cryptoanalysis", IEEE International Symposium on Circuits and Systems, Jun. 9-12, 1997, Hong Kong, pp. 1061-1064.

Ding, M. et al., "Enhancing Synchronism of Chaotic Systems," Physical Review E, vol. 49, No. 2, pp. R945-R948, Feb. 1994.

Final office action issued by Examiner James Seal on Dec. 21, 2000, in the prosecution of U.S. Appl. No. 09/436,910, now issued as U.S. Patent No. 6,363,153 (Method and apparatus for secure digital chaotic communication).

Hayes, S., Grebogi, C., and Ott, E., "Communicating with Chaos", Phys. Rev. Lett., vol. 70, No. 20, pp. 3031-3034, May 17, 1993.

Hayes, S., Grebogi, C., and Ott, E., "Experimental Control of Chaos for Communication", Phys. Rev. Lett., vol. 73, No. 13, pp. 1781-1786, Sep. 26, 1994.

Hunt, E. R., "Stabilizing High-Period Orbits in a Chaotic System: The Diode Resonator", Physical Review Letters, vol. 67, No. 15, pp. 1953-1957, Oct. 7, 1991.

Kavitha, V. et al., "Use of Chaotic Modeling for Transmission of EEG Data", International Conference on Information, Communications, and Signal Processing, ICICS '97, Singapore, Sep. 9-12, 1997, pp. 1262-1265.

Kruger, P. "Barbarian at the Gates?", Communications international, pp. 46-48, Jan. 1996.

Lai, "Synchronizationof a Chaotic Optical System Using Control", SPIE Chaos in Communication, pp. 91-102, 1993.

Martienssen, W., "Chaotic Cryptology", Annalen der Physik, vol. 4, Issue 1, 1995, pp. 35-42.

Non-final office action issued by Examiner James Seal on Apr. 2, 2000, in the prosecution of U.S. Appl. No. 09/436,910, now issued as U.S. Patent No. 6,363,153 (Method and apparatus for secure digital chaotic communication).

Non-final office action issued by Examiner J. Donels on Dec. 23, 1999, in the prosecution of U.S. Appl. No. 09/437,565, now issued as U.S. Patent No. 6,137,045 (Method and apparatus for compressed chaotic music synthesis).

Ott, E. et al., "Controlling Chaos", Physical Review Letters, vol. 64, No. 11, pp. 1196-1199, Mar. 12, 1990.

Pecora et al., "Synchronization in Chaotic Systems", Physical Review Letters, vol. 64, No. 8, pp. 821-824, Feb. 19, 1990.###(ISR incorrectly cites No. 10, pp. 2374-2383).

Rossler, O. E., "An Equation for Continuous Chaos", Physics Letters A, vol. 57, No. 5, pp. 397-398, Jul. 12, 1976.

Shilnikov, "Mathematical Problems of Nonlinear Dynamics: A Tutorial", International Journal of Bifurcation and Chaos, vol. 7, No. 9, pp. 1953-2001, 1997.

Short, K., "Steps Towards Unmasking Secure Communications," International Journal of Bifurication and Chaos, vol. 4, No. 4, 1994, pp. 959-977.

Yang et. al., "Secure Communication via Chaotic Parameter Modulation", IEEE Transactions on Circuits and System 817-819, 1996.

Yang, T. et al., "Cryptanalyzing Chaotic Secure Communications Using Return Map", Physics Letters A, vol. 245, No. 6, pp. 495-510, Aug. 31, 1998.###(ISR citation was incorrect and incomplete: No vol. No., no date, incorrect pp.).

Yang, Tao, "A Survey of Chaotic Secure Communication Systems", International Journal of Computational Cognition, vol. 2, No. 2, pp. 81-130, Jun. 2004. (http://www.YangSky.com/yangijcc.htm).

Zhou, C., "Extracting Information Masked by Chaos and Contaminated with Noise: Some Considerations on Security of Communication Approaches Using Chaos", Physics Letters A, vol. 234, No. 6, pp. 429-435, Oct. 13, 1997.

Alvarez, et al, "Chaotic Cryptosystems," Institute of Electrical and Electronics Engineers, Proc. 33rd Annual 1999 International Carnahan Conference on Security Technology. (ICCST) Madrid, Spain, Oct. 5-7, 1999, IEEE, US, vol. Conf 33, Oct. 5, 1999, pp. 332-338, XP001003771, ISBN: 0-7803-5248-3.

Newell, et al., "Synchronization of Chaos Using Proportional Feedback," SPIE Chaos in Communications, 1993, pp. 115-130.

Degazio, "Towards a Chaotic Musical Instrument," ICMC Proceedings, pp. 393-395, (1993).

"Cubic Oscillator Explorer v0.51," http://web.archive.org/web/20010211000709/www-ks.rus.uni-stuttgart.de/people/sch . . . (Oct. 20, 2005).

* cited by examiner

Fig 1 Approximate Poincare Map For Double-Scroll Oscillator, With Guiding Line

Fig 2. Double scroll oscillator with surfaces.

Fig. 3 Function r(x) encapsulating symbolic dynamics

METHOD AND APPARATUS FOR CHAOTIC OPPORTUNISTIC LOSSLESS COMPRESSION OF DATA

This Application is a Continuation-In-Part of Short, et al.—Method and Apparatus for Secure Digital Chaotic Communication—application Ser. No. 09/436,910 filed Nov. 9, 1999 now U.S. Pat. No. 6,363,153.

FIELD OF THE INVENTION

The present invention relates generally to a method and apparatus for the compression of digital data. More specifically, it relates to a system for the lossless compression of digital data through the use of chaotic systems.

BACKGROUND OF THE INVENTION

One of the many goals in the information age is to transfer information faster and more efficiently. Information is transmitted through various methods, all with limitations measured in bits/second. The two primary methods adopted for achieving faster and more efficient information transfer are: 1) design equipment that can transfer more bits per second; and 2) design systems that require less bits to carry more information. The present invention is directed at the latter method.

There are many data compression tools currently in existence. The standard feature for most of them is to take common repeating bits of information and "abbreviate" them with predetermined digital "abbreviations" that require fewer bits. The related decompression tool decompresses the compressed data file by "unabbreviating" the predetermined digital "abbreviations" after receiving a key or dictionary of the "abbreviations". The number of known digital "abbreviations" and/or the number of common repeating bits effectively limits this type of compression tool. Therefore a compression tool is needed that does not rely on common repeating bits or known digital "abbreviations" or can expand the space of abbreviations that can be represented efficiently.

Furthermore, the decompression tool normally must access a key to the "abbreviations". The key can require a great deal of memory itself. While the memory required is probably not a significant burden on a desktop or laptop computer, if the key is stored on a hard drive, it is a burden for handheld devices. Cellular phones and other portable, handheld devices do not have the hard drive space to efficiently carry or receive an "abbreviations" key. Therefore, a compression tool is needed that does not require an "abbreviations" key or any similar memory burden to decompress a compressed file.

In general, a chaotic system is a dynamical system which has no periodicity and the final state of which depends so sensitively on the system's precise initial state that its time-dependent path is, in effect, long-term seemingly random even though it is deterministic. Identical chaotic systems can be distributed in a secure manner between parties. Parties can then use the chaotic systems for data transmission after synchronizing their chaotic systems.

In one method, described in Short, et al—Method and Apparatus for Secure Digital Chaotic Communication—application Ser. No. 09/436,910 filed Nov. 9, 1999 and incorporated herein by reference ("Short et al.—Chaotic Communication"), a chaotic system is used to generate a secured digital communication link. An encrypting party creates a message bit stream to be transmitted to a decrypting party. Controls are intermittently applied by a transmitter-encoder to a chaotic system corresponding to the message bit stream. A control/no control bitstream is thereby created in which a 0 indicates that no control was applied and a 1 indicates that a control was applied. The control/no control bitstream and a prepended synchronization bitstream are transmitted to a receiver-decoder. An identical chaotic system in the receiver-decoder is driven into synchrony and is then subject to intermittent controls based on the control/no control bitstream, thereby causing the identical chaotic system to generate the message bit stream. It would be useful to harness the attributes of chaotic systems used for the secured digital communication link for data compression as well.

SUMMARY OF THE INVENTION

An object of the present invention is to provide a new method and apparatus for compression of digital data.

Another object of the present invention is to provide a more efficient, more secure method and apparatus for compression of digital data.

The present invention may be implemented either in hardware or software to compress data. An initialization code is sent to a first chaotic system that is then allowed to begin generating a seemingly random sequence of bits 0 and 1. Controls are intermittently applied to the chaotic system to manipulate the system to generate bits strings. The data strings which make up the data to be compressed are then compared to the bit strings of up to n bits (for some number n, dependent on the application) generated by the application of the controls to find matching strings. If a single matching bit string cannot be found for one n-bit portion of the data, multiple bit strings can be combined to create a matching n bit portion of the data. Once all the data strings that make up the data to be compressed are replaced, the original data is discarded and the collected control bit strings, which were applied to the chaotic system to generate the matching data, are stored as the compressed data file. To decompress, the same or a mathematically identical chaotic system is driven into synchrony and is then subjected to intermittent controls based on the stored control bit strings, thereby causing the system to regenerate the original data.

The foregoing and other objects, features and advantages of the current invention will be apparent from the following more detailed description of preferred embodiments of the invention as illustrated in the accompanying drawings.

DETAILED DESCRIPTION OF THE INVENTION

The present invention is based on two important attributes of chaotic systems. The first such attribute is that the trajectory of a chaotic system will visit different regions of the system over time. If the different regions of the system are labeled 0 or 1, an seemingly random bitstream will be generated by the trajectory, as is described in more detail below. Alternatively, the different regions of the system may be labeled with any symbols, and the trajectory will generate an seemingly random string of such symbols. The string of symbols can then be converted to a bitstream according to an appropriate algorithm. For example, a string of letters and base 10 numbers can be converted using the ASCII algorithm. Controls can also be imposed on a chaotic system to cause it to generate a specific bitstream. The second such attribute is that certain controls may be used as initialization codes, as is also described in more detail below, to synchronize identical chaotic systems. The synchronized chaotic systems will then generate identical bitstreams.

Figure 1:
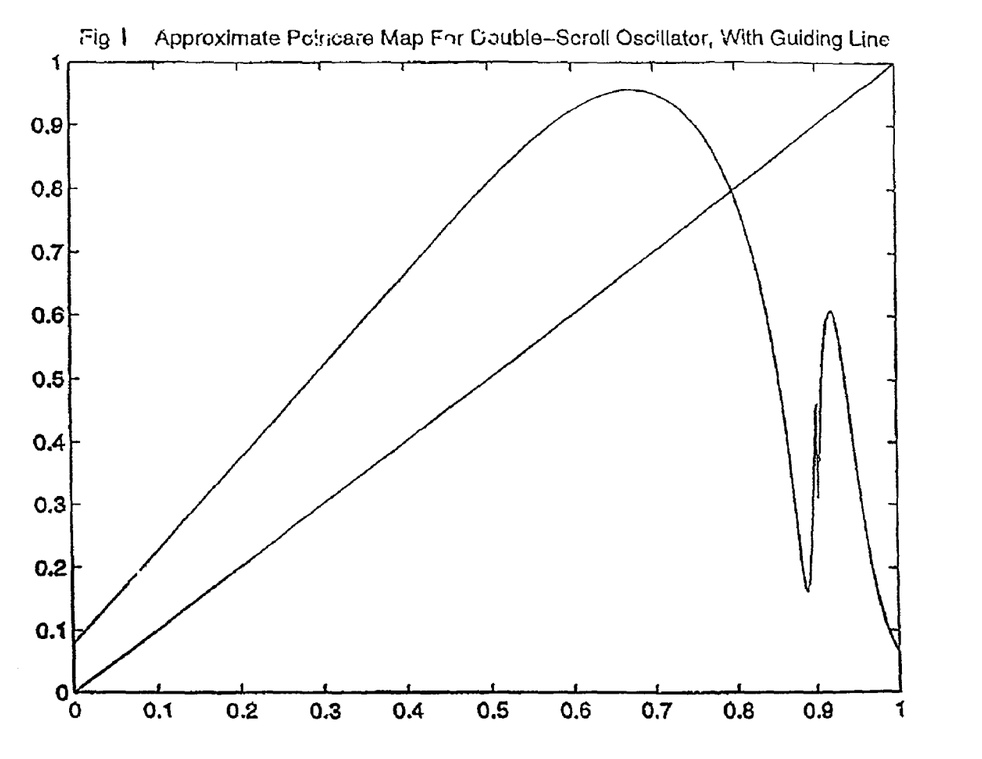
FIG. 1 is a plot of the Poincare Map for the given double scroll oscillator.

In a preferred embodiment, such a chaotic system is a double-scroll oscillator [S. Hayes, C. Grebogi, and E. Ott, Communicating with Chaos, Phys. Rev. Lett. 70, 3031 (1993)], described by the differential equations $$C_1 \dot{v}_{C1} = G(v_{C2} - v_{C1}) - g(v_{C1})$$

$$C_2 \dot{v}_{C2} = G(v_{C1} - v_{C2}) + i_L$$

$$L \dot{i}_L = -v_{C2},$$

where $$g(v) = \begin{cases} m_1 v, & \text{if } -B_p \leq v \leq B_p; \\ m_0(v + B_p) - m_1 B_p, & \text{if } v \leq -B_p; \\ m_0(v - B_p) + m_1 B_p, & \text{if } v \geq B_p \end{cases}$$

The attractor that results from a numerical simulation using the parameters $C_1=1/9$, $C_2=1$, $L=1/7$, $G=0.7$, $m_0=-0.5$, $m_1=-0.8$, and $B_p=1$ has two lobes, which can be labeled 0 and 1, and each of which surrounds an unstable fixed point, as shown in FIG. 1.

Because of the chaotic nature of this oscillator's dynamics, it is possible to take advantage of sensitive dependence on initial conditions by carefully choosing small perturbations to direct trajectories around each of the lobes of the attractor. In this way, steering the trajectories around the appropriate lobes of the attractor, suitably labeled 0 and 1, can generate a desired bit stream. It should be noted that other embodiments could have more than two lobes, in which each lobe is labeled 0 or 1 or a symbol from any chosen symbol set.

There are a number of means to control the chaotic oscillator in this preferred embodiment to specify the bits 0 and 1 more precisely. In a further preferred embodiment, a Poincare surface of section is defined on each lobe by intersecting the attractor with the half planes $$i_L = \pm GF, |v_{C1}| \leq F,$$

where $$F = B_p(m_0 - m_1)/(G + m_0).$$

Figure 2:
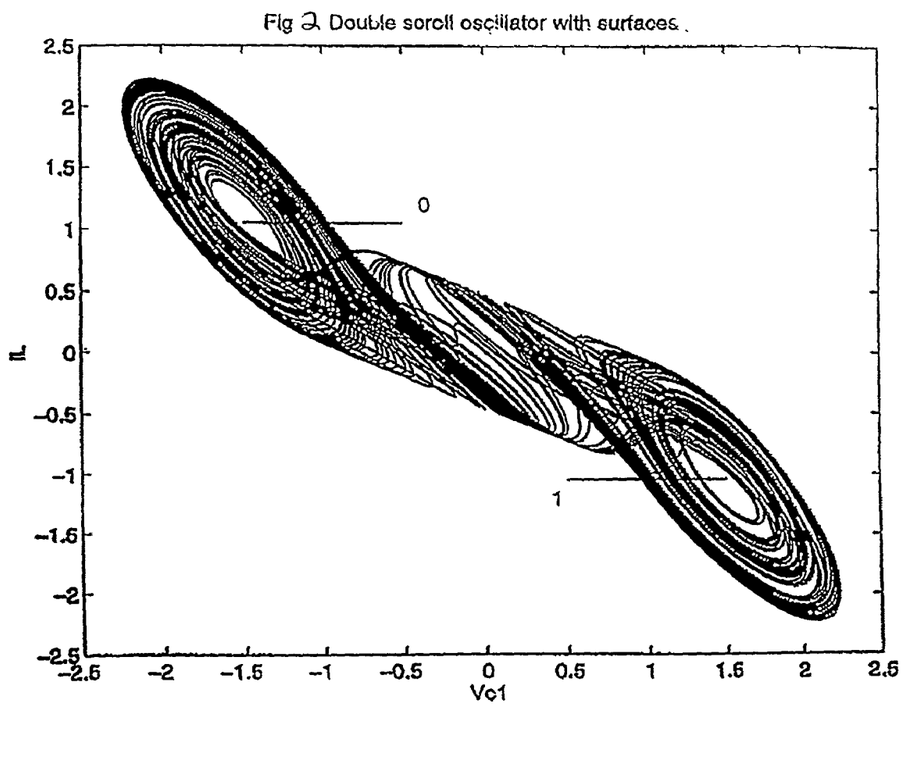
FIG. 2 is a plot of the double scroll oscillator resulting from the given differential equations and parameters.
Figure 3:
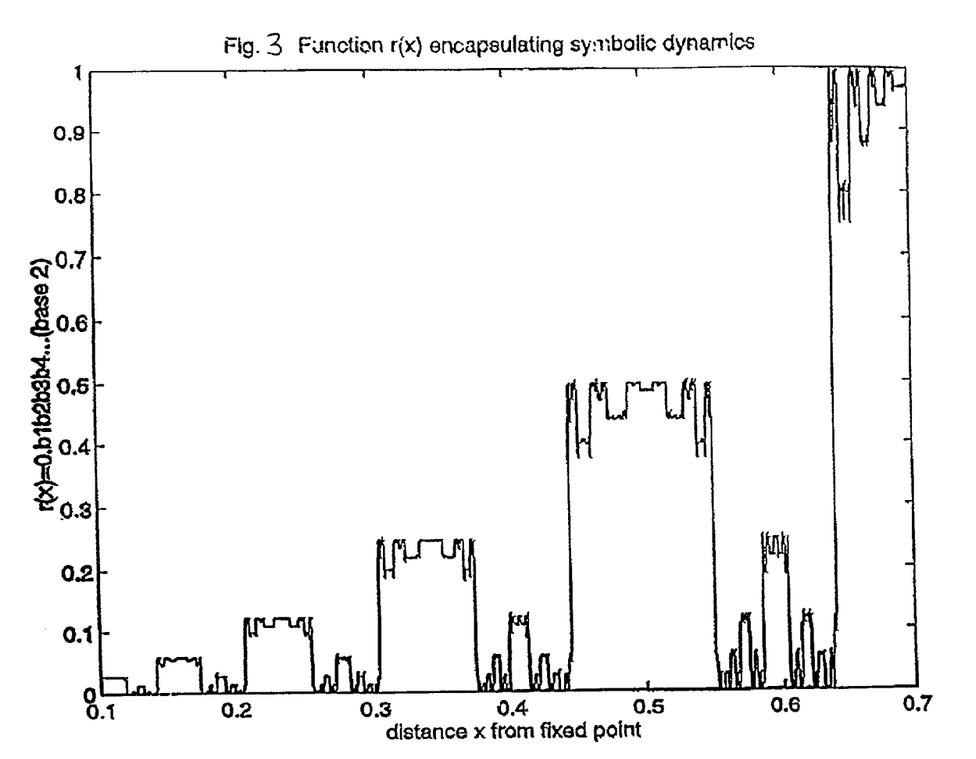
FIG. 3 is a plot of the symbolic dynamics function, r(x).

FIG. 2 is a plot of the Poincare Map for the given double scroll oscillator. When a trajectory intersects one of these sections, the corresponding bit can be recorded. Then, a function $r(x)$ is defined, which takes any point on either section and returns the future symbolic sequence for trajectories passing through that point. If $I_1, I_2, I_3, \ldots$ represent the lobes that are visited on the attractor (so $I_i$ is either a 0 or a 1), and the future evolution of a given point $x_0$ is such that $x_0 \rightarrow I_1, I_2, I_3, \ldots, I_N$ for some number N of loops around the attractor, then the function $r(x)$ is chosen to map $x_0$ to an associated binary fraction, so $r(x_0) = 0. I_1 I_2 I_3 \ldots I_N$, where this represents a binary decimal (base 2). Then, when $r(x)$ is calculated for every point on the cross-section, the future evolution of any point on the cross-section is known for N iterations. The resulting function is shown in FIG. 3, where $r(x)$ has been calculated for 12 loops around the attractor.

Control of the trajectory begins when it passes through one of the sections, say at $x_0$. The value of $r(x_0)$ yields the future symbolic sequence followed by the current trajectory for N loops. If generation of a desired bit stream requires a different symbol in the Nth position of the sequence, $r(x)$ can be searched for the nearest point on the section that will produce the desired symbolic sequence. The trajectory can be perturbed to this new point, and it continues to its next encounter with a surface. It should be noted that this embodiment exhibits a "limited grammar," which means that not all sequences of 0's and 1's can be directly encoded, because the chaotic oscillator always loops more than once around each lobe. Consequently, a sequence of bits such as 00100 is not in the grammar since it requires a single loop around the 1-lobe. A simple remedy is to repeat every bit in the code or append a 1- or 0-bit to each contiguous grouping of 1- or 0-bits, respectively. Other embodiments may have a different grammar, and examples exist where there are no restrictions on the sequence of 0's and 1's. For this system, the bitstream is read from the oscillation of coordinate $i_L$, so the bit stream is read from the peaks and valleys in $i_L$ (there are small loops/minor peaks that occur as the trajectory is switching lobes of the attractor, but these are ignored.)

The calculation of $r(x)$ in the preferred embodiment was done discretely by dividing up each of the cross-sections into 2001 partitions ("bins") and calculating the future evolution of the central point in the partition for up to 12 loops (the number of loops does not need to be limited to 12) around the lobes. In addition to recording $r(x)$, a control matrix M was constructed that contains the coordinates for the central points in the bins, as well as instructions concerning the controls at these points. These instructions simply tell how far to perturb the system when it is necessary to apply a control. For example, at an intersection of the trajectory with a cross-section, if $r(x_0)$ indicates that the trajectory will trace out the sequence 10001, and sequence 10000 is desired, then a search is made for the nearest bin to $x_0$ that will give this sequence, and this information is placed in M. (If the nearest bin is not unique, then there must be an agreement about which bin to take, for example, the bin farthest from the center of the loop.) Because the new starting point after a perturbation has a future evolution sequence that differs from the sequence followed by $x_0$ by at most the last bit, only two options need be considered at each intersection, control or no control.

The matrix M holds the information about which bin should hold the new starting point for the perturbed trajectory. In a hardware implementation of the preferred embodiment, the perturbations are applied using voltage changes or current surges; in a mapping-based hardware implementation, the perturbations are contained in a look-up table and would result in a variable replacement in the mapping function. In a software implementation of the preferred embodiment, the control matrix M would be stored along with the software computing the chaotic dynamics so that when a perturbation is required, the information would be read from M.

A further improvement involves the use of microcontrols. Each time a trajectory of a chaotic system passes through a cross-section, the simulation is backed-up one time step, and the roles of time and space are reversed in the Runge-Kutta solver so that the trajectory can be integrated exactly onto the cross-section without any interpolation. Then, at each intersection where no control is applied, the trajectory is reset so that it starts at the central point of whatever bin it is in. This resetting process can be considered the imposition of microcontrols. It removes any accumulation of round-off error and minimizes the effects of sensitive dependence on initial conditions. It also has the effect of restricting the dynamics to a finite subset of the full chaotic attractor although the dynamics still visit the full phase space. These restrictions can be relaxed by calculating r(x) and M to greater precision at the outset.

Another embodiment of a chaotic system utilizes an approximate one-dimensional Poincare map. The Poincare section has two branches, one on each lobe of the attractor. The partitioning of the surface and the use of microcontrols allow one to calculate easily a map that exhibits all of the symbolic dynamics of the full microcontrolled system. The evaluation of this map is much simpler and faster than integrating between intersections with the surface of section. To find the map, one can take the center point in each bin as an initial condition (since these are the points to which the microcontrols "reset" trajectories), integrate forward in time until the next intersection with either branch of the surface of section, and note the branch and bin in which the trajectory landed. For a given set of integration parameters (time step, method, etc.) and for a given partition of the surface of section, the trajectory from the center of any bin to its next intersection with the surface will not vary. Therefore, the map mimics exactly the behavior of the microcontrolled system for the given integration method.

To implement this map, two more columns are placed in the control matrix M: one containing the row number in M that corresponds to the next intersection for all 2001 bins, and the other containing the next lobe under the map. Simulated data transmission and reception using this new matrix is essentially the same as transmission and reception using integration. For a given bin on the section and for a given message bit, the transmitter-encoder still uses the function r(x) to compare the symbolic dynamics N bits in the future. If the N-th bit in the future dynamics for that bin differs from the current message bit, r(x) is used to find the nearest bin that will produce the desired sequence. Then the map is used to find the location of the next intersection with the surface, and the process is repeated with the next message bit. The use of this map eliminates time-consuming numerical integration, allowing for faster and more extensive processing.

The above map differs from a conventional Poincare map in a couple of aspects. First, while the Poincare section is two-dimensional, it is being approximated with a pair of lines extending from the unstable fixed points fitted with a least-squares method. Whenever a trajectory intersects the section, by only considering the distance from the corresponding fixed point, the point of intersection is essentially rotated about the fixed point onto the line before proceeding. Therefore the three-dimensional dynamical system is reduced to a one-dimensional map. Secondly, the point is reset to the center of its current bin to simulate the microcontrols. Theoretically, letting the maximum length of the intervals in the partition go to zero would make this second approximation unnecessary.

The use of a Poincare map allows a generalization of the system to any chaotic one-dimensional map. It is simply a matter of defining "lobes"—what section of the domain implies a switching of bits, recording the symbolic dynamics in r(x) and finding appropriate controls as before. For example, one could take the logistics map $x_n = ax_{n-1}(1-x_{n-1})$ and somewhat arbitrarily say that for any $x_k$ $x_{lobe}$, where $0 < x_{lobe} < 1$, the current bit $b_k$ will be $1-b_{k-1}$: —otherwise, $b_k = b_{k-1}$. This gives the symbolic dynamics necessary to build a system, and this freedom improves the mapping in at least two ways. First, maps can be chosen that have no grammar restriction, which would eliminate the need to adjust the bit stream to comply with the system's dynamics. Second, it is possible to fine-tune the maps to optimize the system statistically.

To eliminate the restriction that bits must at least come in pairs, it is necessary that the map allow trajectories to remain in the "switching" region for two or more iterations in a row. For example, one can use the second iterate of the logistics map, $x_n = a^2 x_{n-1}(1-x_{n-1})(1-ax_{n-1}(1-x_{n-1}))$, with a=3.99. To preserve the symmetry, it is logical to choose $x_{lobe} = 0.5$. All short binary words are possible in the natural evolution of this map, so there are no grammar restrictions with this system.

The chaotic system in the preferred embodiment described above had two lobes, labeled 0 and 1. Other chaotic systems can have more than two lobes, and each lobe can be labeled 0 or 1 so that a bitstream is generated as each such lobe is visited by the trajectory of the system. Alternatively, each lobe can be assigned a symbol from any chosen symbol set so that a symbol sequence is generated by the trajectory of the system. The string of symbols can be converted into a bitstream according to an appropriate algorithm.

In another embodiment, starting with the chaotic system in the preferred embodiment described above, rather than labeling the lobes of the chaotic system, one can label the control bins on the control surfaces. The bins can be labeled 0 or 1, or each bin can be assigned a symbol from any chosen symbol set. Then a bitstream is generated by the trajectory of the chaotic system. The trajectory of a chaotic system can be used in many ways to generate a bitstream. For example, using the chaotic system in the preferred embodiment described above, one can track the intersections of the trajectory with the control surfaces and compare the $i^{th}$ intersection with the $(i+1)^{th}$ intersection and use a distance measure between the bins in which the intersections occurred to form an information string, which can be converted to a bit string. For instance, if the distance measured is fourteen bins, the binary string for fourteen is an information string. As another example, one can apply a threshold to the amplitudes of the oscillations of the trajectory. Whenever an oscillation is above the threshold, a 1-bit is generated and whenever an oscillator is below the threshold a 0-bit is generated, resulting in a bitstream. Or multiple amplitude thresholds can be set using combinations of 1-bit and 0-bit labels for each threshold.

A chaotic system, such as those described above in the various embodiments, can be driven into synchrony with an identical chaotic system by the use of an initialization code. It is possible to send an initialization code, consisting of a sequence of controls to each of the chaotic systems that will drive each of them onto the same periodic orbit. Once on the periodic orbit, an additional bit sent to it will cause it to leave the periodic orbit and generate a bitstream as described in detail above.

At a fundamental level, when microcontrols are used, there are only a finite number of orbits on a chaotic system, so periodicity of a chaotic system would eventually be guaranteed under a repeating sequence of controls. More importantly, a chaotic system can be driven onto a periodic orbit by sending it a repeating code. Different repeating codes lead to different periodic orbits. The periodic orbit reached is dependent only on the code segment that is repeated, and not on the initial state of the chaotic system (although the time to get on the periodic orbit can vary depending on the initial state). Consequently, it is possible to send an initialization code to two chaotic systems that drives them onto the same periodic orbit.

There are numerous control sequences that, when repeated, lead to a unique periodic orbit for all initial states, so that there is a one-to-one association between a sequence and the orbit. However, for some control sequences the orbits themselves change as the initial state of the chaotic system changes. Consequently, repeated control sequences can be divided into two classes, initializing codes and non-initializing codes. The length of each periodic orbit is an integer multiple of the length of the repeated control sequence. This is natural, since periodicity is attained only when both the current position on the cross-section as well as the current position in the control sequence is the same as at some previous time. As described herein, any control codes correspond to orbits that can be stabilized and utilized using a smaller possible substring of the control code, since the full control code can be viewed as an integer multiple of the substring code.

Chaotic systems can be implemented entirely in software. The chaotic systems in one such implementation are defined by a set of differential equations governing the chaotic dynamics, e.g., the double scroll equations described above. An algorithm is used to simulate the evolution of the differential equations, e.g., the fourth order Runge-Kutta algorithm. In a second software implementation, mappings instead of differential equations can be used to define the chaotic systems. In this case, the chaotic systems are defined to take an input value and produce an output value.

Chaotic systems can also be implemented in hardware. The chaotic systems are still defined by a set of differential equations, but these equations are then used to develop an electrical circuit that will generate the same chaotic dynamics. The procedure for conversion of a differential equation into an equivalent circuit is well-known and can be accomplished with operational amplifiers and multipliers, as well as other devices known to one skilled in the art, configured with the proper feedbacks. The control information is stored in a memory device, and increasing voltage or inducing small current surges in the circuit applies controls. In a second hardware implementation, a mapping function is converted into a look-up table that can be stored on a digital memory chip, along with a table containing the control information. Data is compressed by using the look-up table to generate the chaotic dynamics.

A chaotic system can also be implemented in lasers. In this implementation, a set of differential equations is approximated using optical devices. Once the approximate system is developed, it defines the chaotic systems, and then control surfaces, partitions and microcontrols are defined for the chaotic dynamics realized by the laser system. The laser is driven into a chaotic mode of oscillation, and controls are developed using, e.g. the occasional proportional feedback ("OPF") technique. [E. R. Hunt Phys. Rev. Left. 67, 1953 (1991)]. The control information is stored in a memory device that contains information defining the required controls for both the full controls and the microcontrols, as described above. The microcontrols are applied by using, e.g., OPF controls to drive the chaotic dynamics toward the center of the partitions on the control surfaces.

The ability to drive a chaotic system onto a periodic orbit allows for a novel approach to lossless digital data compression. Since each periodic orbit is created by, for example, a 16-bit code, there is a mapping between the 16-bit code and the information produced by the periodic orbit. Using a number of different techniques, the orbit can be converted into a binary string of bits, and these binary strings can be used as building blocks to recreate strings of data, either by direct substitution of the chaotically-created bit string for the original digital data, or by recombining several chaotically-created bit strings to recreate the original digital data. Once the original digital data has been recreated, the chaotically-created bit strings can be replaced by the 16-bit codes to achieve the data compression. The process to recreate the original digital data can be implemented in one embodiment through the following steps:

1. A chaotic system is selected. The chaotic system can be a chaotic map or a continuous chaotic flow. A chaotic control scheme is imposed. Control strings of p-bits are used to create periodic orbits.
2. A rule for conversion to a binary string of bits is selected. Many possible rules are available with the only requirement being that the dynamics are converted into a binary string of bits.
3. A section of the original data is recreated by substituting the chaotically-created binary strings of bits, or by recombining the chaotically-created binary strings of bits. A typical approach for recombination would be to do modulo 2 addition of the chaotically-created binary strings of bits so that the sum would be equal to the original digital data. Then the control strings that generated the chaotically-created bits are saved.
4. The recreation process continues for the next section of the original data, and so forth, until all of the data has been processed and compressed.

The size of the section of the original data compressed can be varied in order to achieve a high compression ratio. The algorithm would first attempt to take a long section of data and attempt to recreate it by chaotically produced binary strings. If a high compression ratio were not achieved, the algorithm would attempt to take smaller sections of data until an acceptable compression ratio is found.

Many control codes correspond to orbits that can be stabilized and utilized using a smaller substring of the control code, since the full control code can be viewed as an integer multiple of the substring code. Thus, the substring initializing code may be repeated twice before the trajectory repeats itself, or the substring initializing code may be repeated three times before the trajectory repeats itself, or the even greater multiples. Periodicity implies that the orbit is in the control bin that corresponds to a given position in the control code; it is just that the substring control code may have been used an integer number of times already. An example can be used to clarify this. Consider a substring control code such as 10110, and an extended version 101101011010110. The extended version results from repeating the substring control code three times, and may correspond to a period fifteen initializing orbit as described before; however, the substring control code 10110 may be taken without extension by just repeating it until periodicity is established.

These orbits can be used in a compression scheme, as long as there is an accompanying protocol to establish a starting position. One rule that works would be start the orbit at the position of the innermost intersection with the control surface. Many other rules can be used, but the important point is to establish a mapping between a substring of control bits and an orbit that may be of a length equal to a multiple of the number of substring control bits. Substring control bits can produce a compression of the message bit strings because substring control bits can map to longer trajectories, and these longer trajectories map out message bit strings.

Figure 4:
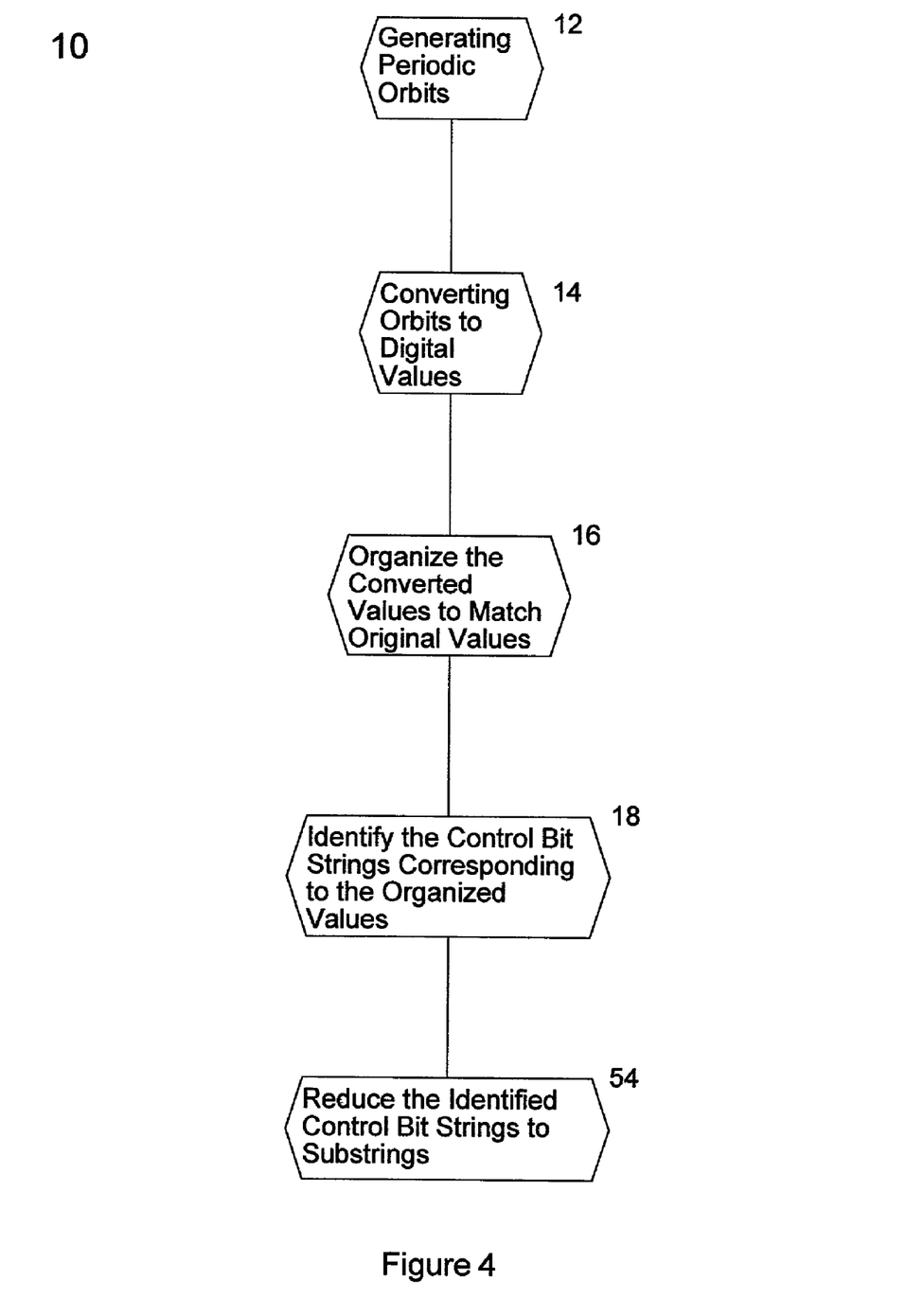
FIG. 4 is a flow chart of a method for compressing digital data according to an embodiment of the present invention.
Figure 5:
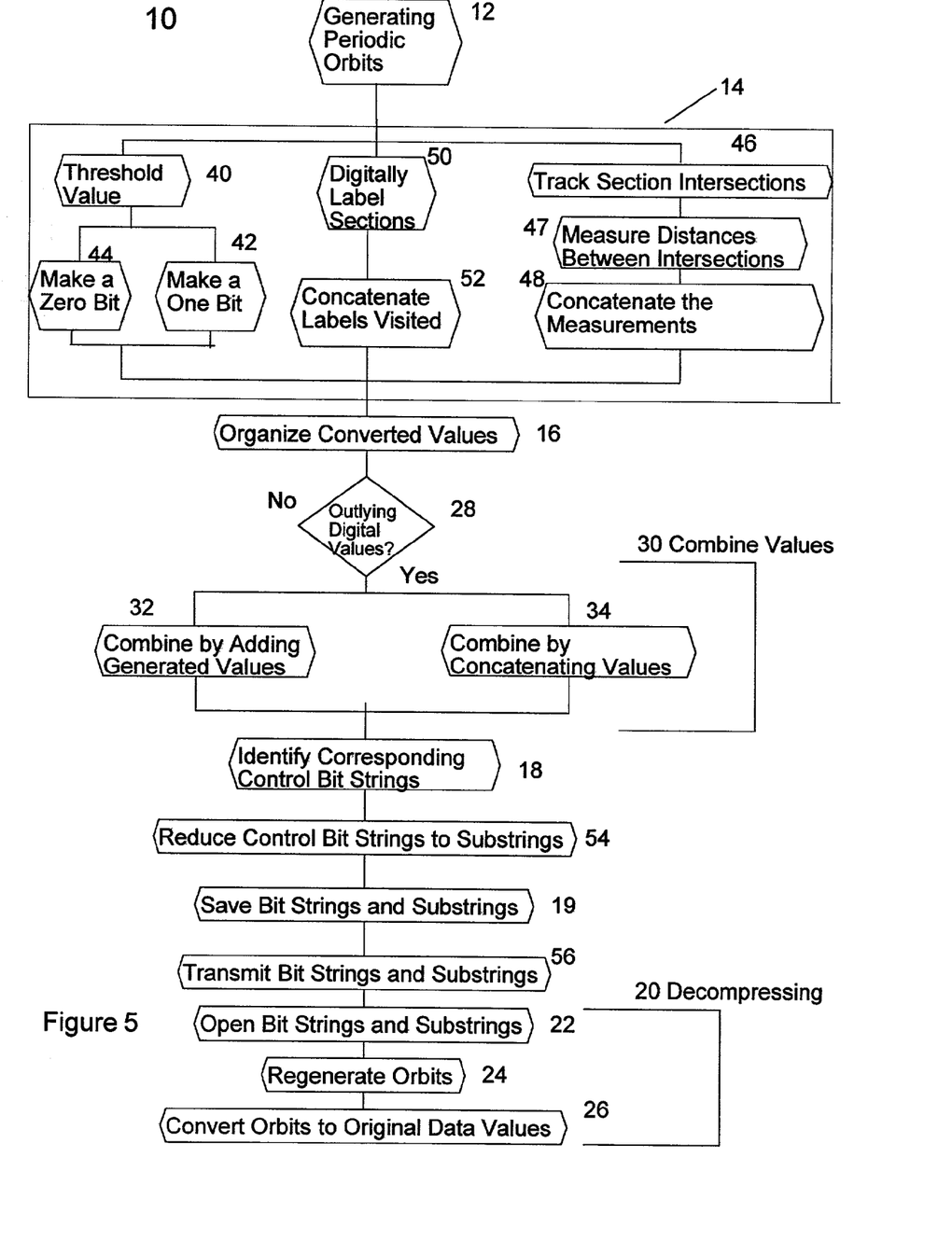
FIG. 5 is a flow chart of a method for compressing digital data according to an embodiment of the present invention.

The present invention is a compression method 10 for compressing digital data. The data is strings of digital values, which can be broken down to a series of 1's and 0's. The present inventive method 10 uses a chaotic system to compress the data. The first step in the inventive method 10 is generating 12 a plurality of periodic orbits that correspond to a plurality of control bit strings. Each of the periodic orbits is formed with a series of numeric values. The next step is to convert 14 the numeric values of the periodic orbits to digital data values, similar in form to the data to be compressed. The digital data values of the periodic orbits are then identically matched 16 to the original digital data values. Then the control bit strings corresponding to the matched 16 digital data values of the periodic orbits are identified 18 in order, such that applying the control bit strings to the chaotic system will regenerate the original data. The final required step involves reducing 54 at least one of the control bit strings in the plurality of control bit strings to a smaller substring. The smaller substring is then used in place of the corresponding control bit string. Preferably, a substantial number of the control bit strings are reduced, but some control bit strings may be irreducible.

In one embodiment of the inventive method 10, the identified control bit strings, which includes the reduced and substituted substrings, are saved 19 to a memory device. In another embodiment, the identified control bit strings are transmitted 56 to a receiver. Transmitting 56 can be accomplished in lieu of or in addition to saving 19 the identified control bit strings. If transmitting 56 is performed in lieu of saving 19, the receiver will decompress during transmission.

A narrower embodiment of the inventive compression method 10 includes decompressing 20 the compressed data, which involves a few steps. First, the saved 18 control bit strings are opened 22. Then the periodic orbits corresponding to the saved 18 control bit strings are regenerated 24. Finally, the numeric values of the periodic orbits are converted 26 to digital data values. One benefit of this decompression step is that access to a compression dictionary is not required, unlike most compression tools.

A narrower embodiment of the step of matching 16 occurs when an outlying digital data value in the original data values exists 28. An outlying digital data value exists 28 when a string of bits in the original data exists without a single matching digital data value string from the converted 14 numeric values of the periodic orbits. In this case, at least two separate digital data values from the converted 14 numeric values of the periodic orbits are combined 30 to construct a matching 16 digital data value for the outlying digital data value. One method for accomplishing this combination 30 is by adding 32 multiple converted numeric values of the periodic orbits to construct a matching 16 digital data value for the outlying digital data value. A second method for accomplishing this combination 30 is concatenating 32 multiple converted numeric values of the periodic orbits to construct a matching 16 digital data value for the outlying digital data value.

The inventive method 10 can be accomplished when the original data values and converted numeric values are each up to n-bits long.

A narrower embodiment of the step of converting 14 the numeric values of the plurality of periodic orbits to generated digital data values involves setting 40 a threshold value, making 42 any orbit value in a periodic orbit greater than the threshold value a 1, and making 44 any remaining orbit value a 0. Alternatively, converting 14 the numeric values of the periodic orbits involves tracking 46 the intersections of the trajectory with the control surfaces, measuring 47 the distance between consecutive intersections, and concatenating 48 the binary forms of the measurements. Alternatively, converting 14 the numeric values of the periodic orbits to digital data values involves labeling 50 different sections of the chaotic system with digital labels or coordinates and concatenating 52 the digital labels or coordinates visited during periodic orbit. These are three of a theoretically infinite number of ways to digitally convert 14 the numeric values of the periodic orbits.

Figure 6:
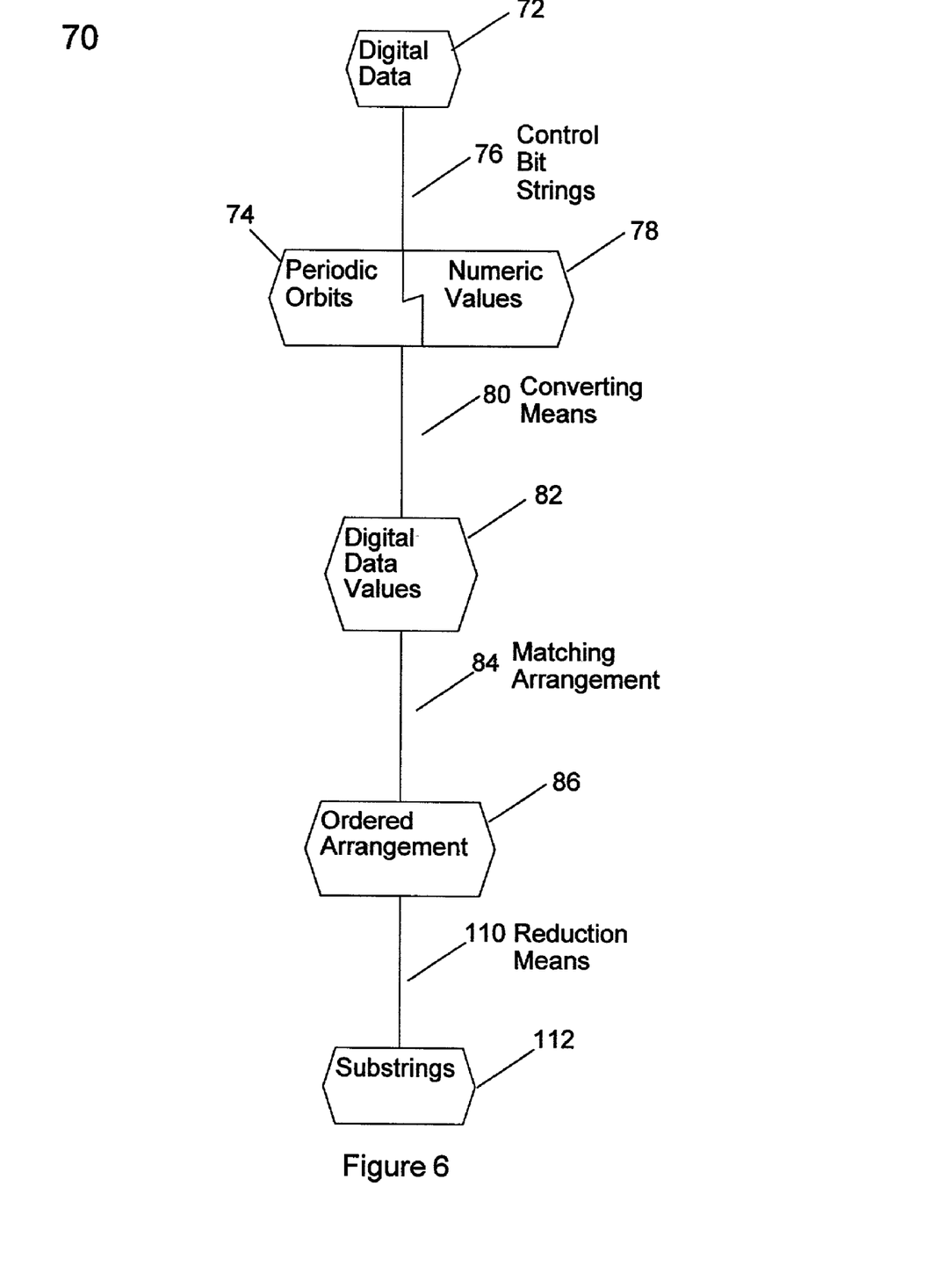
FIG. 6 is a block diagram for a system of compressing digital data according to the present invention.

The present invention as shown in FIG. 6 is also an inventive system 70 for compressing digital data 72. The data 72 is composed of strings of digital values, which can be broken down to a series of 1's and 0's. The inventive system 70 includes a plurality of periodic orbits 74 corresponding to a plurality of control bit strings 76. The periodic orbits 74 have a series of numeric values 78. The inventive system 70 further includes a converting means 80 for using the numeric values 78 of the plurality of periodic orbits 74 to generate a set of digital data values 82. The system 70 also includes a matching arrangement 84 organizing the generated digital data values 82 to identically match the generated digital data values 82 to the original digital data values 72. Next, the system 70 includes an ordered arrangement 86 of the control bit strings 76 correspond to the matching arrangement 84 of generated digital data values 82. Finally, the invention involves having a reduction means 110 for reducing each control bit string 76 to a smaller substring 112 whereby the smaller substring 112 is used in place of the control bit string 76.

One narrower embodiment involves having a storage location 88 in which the ordered arrangement 86 of the substrings 112 is stored.

Another narrower embodiment involves having a transmitter 118 from which the ordered arrangement 86 of the substrings 112 is transmitted. If, when transmitting to a receiver, the receiver immediately decompresses the ordered arrangement 86 of the substrings 112, a process sometimes referred to as "streaming", a storage location 88 to save the ordered arrangement 86 is not required.

Figure 7:
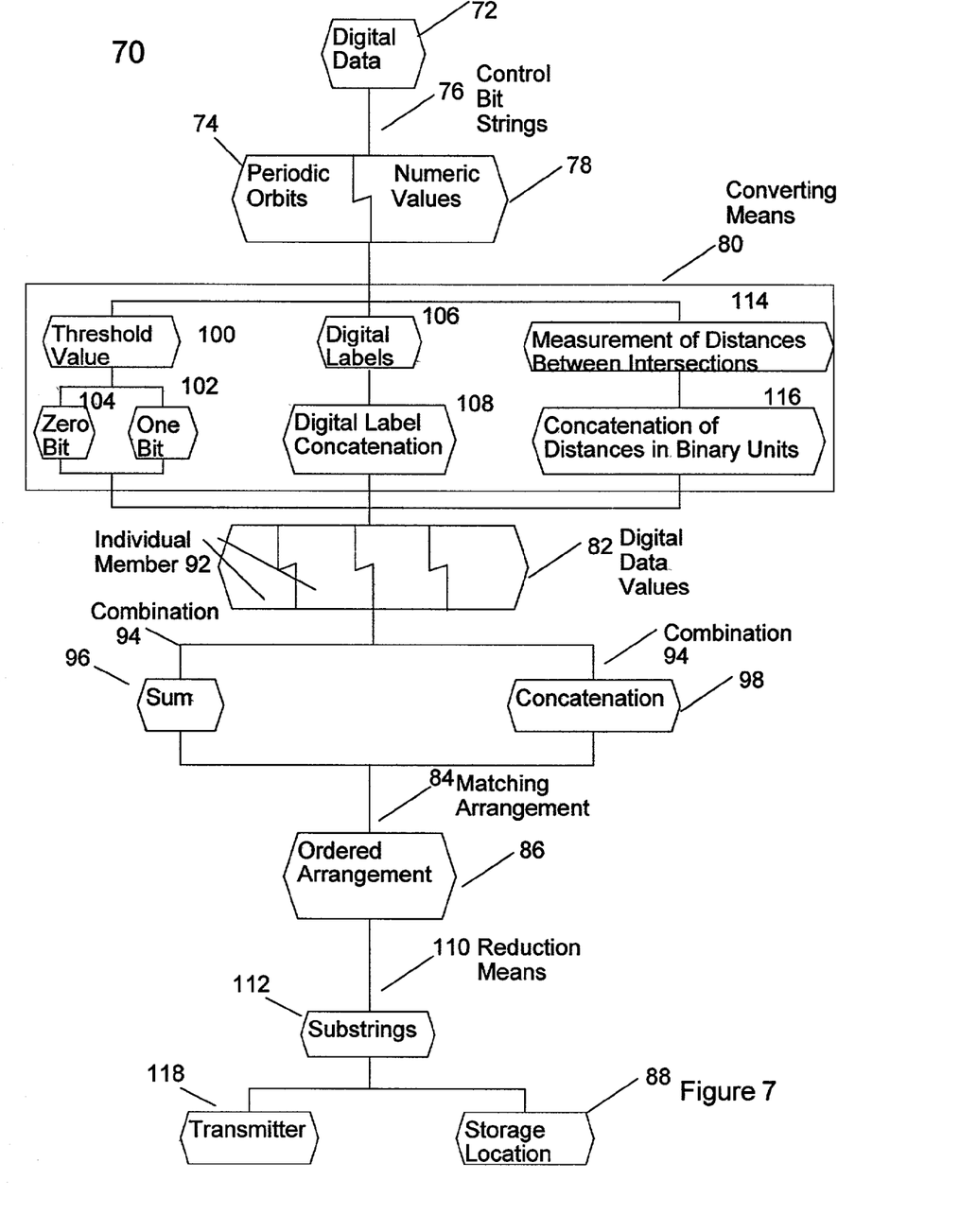
FIG. 7 is a block diagram for a system of compressing digital data according to the present invention.

The inventive system 70 may, as shown in FIG. 7, have an outlying digital data value in the original digital values 72 wherein no individual member 92 of the set of generated digital data values 82 matches the outlying digital data value. In this circumstance, the matching arrangement 84 of generated digital values 82 includes a generated digital data value combination 94 consisting of a plurality of individual members 92 of the set of generated digital data values 82. This combination 94 may be constructed by a sum 96 of multiple individual members 92 of the set of generated digital data values 82. Alternatively, this combination 94 may be constructed by a concatenation 98 of the plurality of individual members 92 of the set of generated digital data values 82.

A narrower embodiment of the inventive system 70 involves the original 72 and generated digital data values 82 being up to n bits long.

A narrower embodiment of the converting means 80 involves having a threshold value 100, a one bit value 102 for any orbit value in a periodic orbit 74 greater than the threshold value 100 and, a zero bit value 104 for any remaining orbit value. Alternatively, the converting means 80 may involve the measurement 114 of distances between consecutive intersections of the trajectory with the control surfaces and concatenation 116 of the distances using binary units. Alternatively, the converting means 80 may involve having a plurality of digital labels 106 for sections of the chaotic system and a digital label concatenation 108 of the chaotic system sections visited during periodic orbit 74.

The invention has been particularly shown and described above with reference to various preferred embodiments implementations and applications. The invention is not limited, however, to the embodiments, implementations or applications described above, and modification thereto may be made within the scope of the invention.

What is claimed is:

1. A compression method for compressing data having original digital data values, said method using a chaotic system, said method comprising the steps of:
   generating a plurality of periodic orbits corresponding to a plurality of control bit strings, said periodic orbits having numeric values;
   converting the numeric values of the plurality of periodic orbits to generated digital data values;
   matching generated digital data values to original digital data values;
   identifying the control bit strings that correspond to the matching generated digital data values; and
   reducing at least one control bit string in the plurality of control bit strings to a smaller substring whereby the smaller substring is substituted in place of the control bit string.

2. The compression method of claim 1 further comprising decompressing, which comprises the steps of:
   receiving the identified control bit strings;
   regenerating the plurality of periodic orbits corresponding to the identified control bit strings;
   and converting the numeric values of the plurality of periodic orbits to original digital data values.

3. The method of claim 2 wherein the step of decompressing is accomplished without access to a compression dictionary.

4. The method of claim 3 wherein the step of converting further comprises adding numeric values of the at least two separate generated digital data values to construct a matching generated digital data value for the outlying digital data value.

5. The method of claim 3 wherein the step of converting further comprises using the at least two separate generated digital data values to each represent a portion of a matching generated digital data value for the outlying digital data value.

6. The method of claim 1 wherein the step of matching further comprises:
   finding an outlying digital data value in the original digital data values whereby a single matching generated digital data value does not exist; and
   combining at least two separate generated digital data values to construct a matching generated digital data value for the outlying digital data value.

7. The method of claim 3 wherein the step of converting the numeric values of the plurality of periodic orbits to generated digital data values further comprises:
   setting a threshold value;
   making any orbit value in a periodic orbit greater than the threshold value a one; and
   making any remaining orbit value a zero.

8. The method of claim 1 wherein the step of converting the numeric values of the plurality of periodic orbits to generated digital data values further comprises:
   setting a threshold value;
   making any orbit section value in a periodic orbit greater than the threshold value a one; and
   making any remaining orbit section value a zero.

9. The method of claim 1 wherein the step of converting the numeric values of the plurality of periodic orbits to generated digital data values further comprises:
   labeling different sections of the chaotic system with digital labels; and
   concatenating digital labels of sections of the chaotic system visited during the periodic orbit by the digital labels thereby generating the generated digital data values.

10. The method of claim 1 further comprising saving the identified control bit strings that correspond to the matching generated digital data values.

11. The method of claim 1 further comprising transmitting the identified and reduced control bit strings to a receiver.

12. A system for compressing data having original digital data values, said system using a chaotic system, said system comprising:
    a plurality of periodic orbits corresponding to a plurality of control bit strings, said plurality of periodic orbits having numeric values;
    a converting means for using the numeric values of the plurality of periodic orbits to generate a set of generated digital data values;
    a matching arrangement of generated digital data values matching the set of generated digital data values to original digital data values;
    an ordered arrangement of the control bit strings correspond to the matching arrangement of generated digital data values; and
    a reduction means for reducing each control bit string in the plurality of control bit strings to a smaller substring whereby the smaller substring is then used in place of the control bit string.

13. The system of claim 12 wherein:
    the original digital data values further comprises an outlying digital data value in the original digital data values whereby no individual member of the set of generated digital data values matches the outlying digital data value; and
    the matching arrangement of generated digital data values further comprises a generated digital data value combination consisting of a plurality of individual members of the set of generated digital data values.

14. The system of claim 13 wherein the generated digital data value combination further consists of a sum of the plurality of individual members of the set of generated digital data values to construct part of the matching arrangement of generated digital data values for the outlying digital data value.

15. The system of claim 13 wherein the generated digital data value combination further consists of a concatenation of the plurality of individual members of the set of generated digital data values.

16. The system of claim 12 wherein the converting means further comprises:
   a threshold value;
   a one bit value for any orbit value in a periodic orbit greater than the threshold value; and
   a zero bit value for any remaining orbit value a zero.

17. The system of claim 12 wherein the converting means further comprises:
   a threshold value;
   a one bit value for any orbit section value in a periodic orbit greater than the threshold value; and
   a zero bit value for any remaining orbit section value.

18. The system of claim 12 wherein the converting means further comprises:
   a plurality of digital labels for sections of the chaotic system; and
   a digital label concatenation of the chaotic system sections visited during periodic orbit.

19. The system of claim 12 further comprising a storage location in which the ordered arrangement of the substrings are stored.

20. The system of claim 12 further comprising a transmitter for transmitting the ordered arrangement of the substrings to a receiver whereby the receiver only requires a mathematically identical chaotic system to decompress the ordered arrangement of the substrings.

* * * * *